United States Patent
Sashi et al.

(10) Patent No.: US 9,594,191 B2
(45) Date of Patent: Mar. 14, 2017

(54) SOLAR REFLECTOR PLATE

(71) Applicant: JFE Steel Corporation, Tokyo (JP)

(72) Inventors: Kazumichi Sashi, Tokyo (JP); Takahiko Oshige, Tokyo (JP); Shin Ishikawa, Tokyo (JP); Yoshihito Sakamoto, Tokyo (JP); Takahiro Kubota, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/391,420

(22) PCT Filed: Mar. 19, 2013

(86) PCT No.: PCT/JP2013/057878
§ 371 (c)(1),
(2) Date: Oct. 9, 2014

(87) PCT Pub. No.: WO2013/153923
PCT Pub. Date: Oct. 17, 2013

(65) Prior Publication Data
US 2015/0109696 A1    Apr. 23, 2015

(30) Foreign Application Priority Data
Apr. 12, 2012  (JP) ................. 2012-091286

(51) Int. Cl.
*G02B 1/14*    (2015.01)
*G02B 1/10*    (2015.01)
(Continued)

(52) U.S. Cl.
CPC ............... *G02B 1/14* (2015.01); *B32B 15/08* (2013.01); *B32B 15/09* (2013.01); *B32B 15/18* (2013.01);
(Continued)

(58) Field of Classification Search
CPC ... G01B 11/26; F24J 2/10; F24J 2/1047; F24J 2/12; F24J 2/541; Y02E 10/47;
(Continued)

(56) References Cited

U.S. PATENT DOCUMENTS 4,343,533 A    8/1982  Currin et al.
5,677,050 A   10/1997  Bilkadi et al.
(Continued)

FOREIGN PATENT DOCUMENTS

CN    1190981        8/1998
EP    1 720 046     11/2006
(Continued)

OTHER PUBLICATIONS

'Alkoxy Oligomer,' Shin'Etsu Silicone Silane Coupling-zai, 2013. 4, [online], (Shin'etsu Silicone), [retrieval date Apr. 9, 2013 (Apr. 9, 2013)], p. 12, Internet <URL:http://qwww.silicone.jp/j/catalog/pdf/SilaneCouplingAgentsJ.pdf.
(Continued)

*Primary Examiner* — Jennifer L. Doak
(74) *Attorney, Agent, or Firm* — DLA Piper LLP (US)

(57) ABSTRACT

A solar reflector plate maintains an excellent reflectance of a reflective layer and has excellent sand resistance and weather resistance. The solar reflector plate includes a substrate; a reflective layer provided onto the substrate; and a protective layer provided onto the reflective layer, wherein the protective layer contains silicon in an amount of 10% by mass to 60% by mass in terms of $SiO_2$ and an organic substance, and has 1.5 to 3.2 oxygen atoms on average that form a chemical bond with silicon.

19 Claims, 1 Drawing Sheet

(51) Int. Cl.
*G02B 5/08* (2006.01)
*B32B 15/08* (2006.01)
*B32B 15/09* (2006.01)
*B32B 15/18* (2006.01)
*C09D 183/08* (2006.01)
*C08G 77/14* (2006.01)
*C08G 77/26* (2006.01)

(52) U.S. Cl.
CPC ........... *C09D 183/08* (2013.01); *G02B 1/105* (2013.01); *G02B 5/0808* (2013.01); *B32B 2255/06* (2013.01); *B32B 2255/10* (2013.01); *B32B 2255/205* (2013.01); *B32B 2255/26* (2013.01); *B32B 2255/28* (2013.01); *B32B 2307/416* (2013.01); *B32B 2307/712* (2013.01); *B32B 2457/12* (2013.01); *C08G 77/14* (2013.01); *C08G 77/26* (2013.01)

(58) Field of Classification Search
CPC .. Y02E 10/45; G02B 1/14; G02B 5/08; G02B 1/105; C09D 183/08; B32B 15/08; B32B 15/00
See application file for complete search history.

(56) References Cited

U.S. PATENT DOCUMENTS

| | | | |
|---|---|---|---|
| 5,861,189 A | 1/1999 | Sheel et al. | |
| 2008/0302418 A1* | 12/2008 | Buller | H01L 31/02168 136/259 |
| 2010/0006141 A1 | 1/2010 | Oikawa et al. | |
| 2011/0261443 A1 | 10/2011 | Isojima et al. | |
| 2012/0301728 A1 | 11/2012 | Saito et al. | |
| 2013/0040148 A1 | 2/2013 | Masuda et al. | |
| 2013/0206214 A1 | 8/2013 | Akaike et al. | |
| 2013/0293951 A1 | 11/2013 | Kumagai | |

FOREIGN PATENT DOCUMENTS

| | | |
|---|---|---|
| JP | 57-004003 A | 1/1982 |
| JP | 57-125901 A | 8/1982 |
| JP | 56-061536 A | 12/1987 |
| JP | 56-061536 B2 | 12/1987 |
| JP | 10-511925 A | 11/1998 |
| JP | 2002-348674 | 12/2002 |
| JP | 2010-41040 | 2/2010 |
| JP | 2010-41040 | 2/2011 |
| JP | 2011-31601 A | 2/2011 |
| JP | 2011-224875 | 11/2011 |
| KR | 2007-0027519 | 3/2007 |
| WO | 2011/105515 | 9/2011 |
| WO | 2011/129411 | 10/2011 |
| WO | 2012/008498 A1 | 1/2012 |
| WO | 2012/029466 A1 | 3/2012 |
| WO | 2012/057005 | 5/2012 |
| WO | 2012/098971 | 7/2012 |

OTHER PUBLICATIONS

Japanese Notification of Reasons for Refusal dated May 12, 2015 of corresponding Japanese Application No. 2014-510097 along with its English translation.
Supplementary European Search Report dated Jun. 9, 2015 of corresponding European Application No. 13776338.9.
Notice of Reasons for Rejection from corresponding Korean Application No. 10-2014-7026190 along with a partial English translation.
Chinese Office Action dated Dec. 30, 2015 of corresponding Chinese Application No. 201380019148.3 along with an English translation of the Search Report.
Japanese Official Action dated Dec. 22, 2015 from corresponding Japanese Patent Application No. 2014-510097 including a Concise Statement of Relevance of Office Action in English.
Korean Office Action dated May 20, 2016, of corresponding Korean Application No. 2014-7026190, along with a Concise Statement of Relevance of Office Action in English.
Chinese Office Action dated Sep. 12, 2016, of corresponding Chinese Application No. 201380019148.3, along with its Search Report in English.

* cited by examiner

SOLAR REFLECTOR PLATE

TECHNICAL FIELD

This disclosure relates to a solar reflector plate suitably used for solar power generation.

BACKGROUND

In the related art, as an optical reflector, those obtained by depositing a thin film of a metal such as aluminum or silver on the front or back surface of a glass substrate having excellent smoothness have been used.

When a thin metal film is deposited onto the surface of a glass substrate, a relatively high reflectance can be obtained. However, when this is used as a reflector plate for solar power generation (solar reflector plate), the plate is inevitably used outdoors. Accordingly, many problems regarding sand resistance, weather resistance, impact resistance, lightening of weight, and the like should be solved.

Regarding those problems, for example, JP 62-57904 B proposes a reflective heat collector plate obtained by providing a reflective metal (aluminum, silver, or the like) deposition film onto the surface of a metal plate (aluminum, stainless steel, or the like), and coating the outer surface of the metal deposition film with a protective film of a transparent inorganic substance (SiO, $SiO_2$, or the like).

Moreover, JP 57-4003 A proposes a reflector including a substrate formed of an appropriate material such as a metal or an alloy like aluminum, a steel plate, or stainless steel, or plastic, a metal reflective film deposited onto the substrate and formed of aluminum, silver, or the like, and a transparent inorganic protective film deposited onto the surface of the metal reflective film and formed of, for example, a vitreous film such as SiO or $SiO_2$.

In addition, JP 57-125901 A proposes a reflector obtained by providing a laminate-like protective layer formed of elements including a coat formed of de-alkalized metal silicate and a resin coat directly stacked and deposited onto the above coat, onto a metal substrate having a reflective surface.

We found that the reflector plates disclosed in JP '904 and JP '003 are excellent in weather resistance since they have a coat containing an inorganic material as a main component. However, if the reflector plates are used as a solar reflector plate frequently positioned in a region where dust flies such as a desert region, the resistance thereof against the flying sand is insufficient.

We also found that since the reflector plate disclosed in JP '901 includes a resin coat as an uppermost surface layer, the sand resistance thereof is very poor.

Accordingly, it could be helpful to provide a solar reflector plate which maintains an excellent reflectance of a reflective layer and has excellent sand resistance and weather resistance.

SUMMARY

We found that if a specific protective layer containing silicon and an organic substance is provided to a solar reflector plate, an excellent reflectance of a reflective layer is maintained, and sand resistance and weather resistance become excellent.

We thus provide the following (1) to (5):

(1) A solar reflector plate comprising:
   a substrate;
   a reflective layer provided onto the substrate; and
   a protective layer provided onto the reflective layer, wherein the protective layer contains silicon and an organic substance, contains silicon in an amount of 10% by mass to 60% by mass in terms of $SiO_2$, and has 1.5 to 3.2 oxygen atoms on average that form a chemical bond with silicon.

(2) The solar reflector plate according to (1), wherein an elastic modulus of the protective layer is 0.1 GPa to 15 GPa.

(3) The solar reflector plate according to (1) or (2), wherein the reflective layer contains aluminum and/or silver.

(4) The solar reflector plate according to any one of (1) to (3), further comprising an interlayer containing at least one kind selected from a group consisting of a silane coupling agent, a titanium coupling agent, a zirconium coupling agent, and an organic resin, between the reflective layer and the protective layer.

(5) The solar reflector plate according to any one of (1) to (4), further comprising at least one base layer constituted with an organic material and/or an inorganic material, between the substrate and the reflective layer.

It is possible to provide a solar reflector plate which maintains an excellent reflectance of a reflective layer and has excellent sand resistance and weather resistance.

DESCRIPTION OF SYMBOLS

1: SUBSTRATE
2: REFLECTIVE LAYER
3: PROTECTIVE LAYER
4: INTERLAYER
5: BASE LAYER
10: SOLAR REFLECTOR PLATE

DETAILED DESCRIPTION

Our solar reflector plate includes a substrate, a reflective layer provided onto the substrate, and a protective layer provided onto the reflective layer, wherein the protective layer contains silicon and an organic substance, contains silicon in an amount of 10% by mass to 60% by mass in terms of $SiO_2$, and has 1.5 to 3.2 oxygen atoms on average that form a chemical bond with silicon.

Next, the overall constitution of the solar reflector plate will be described using drawings.

Figure 1A:
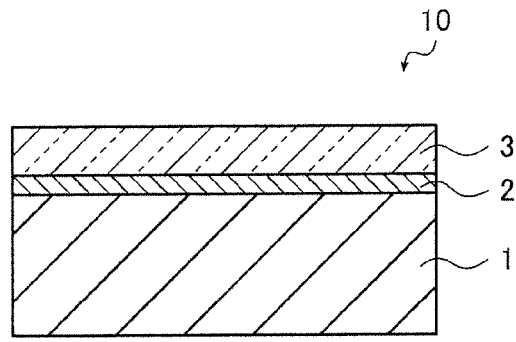
FIG. 1A to 1C are schematic cross-sectional views showing an example of our solar reflector plate.
Figure 1B:
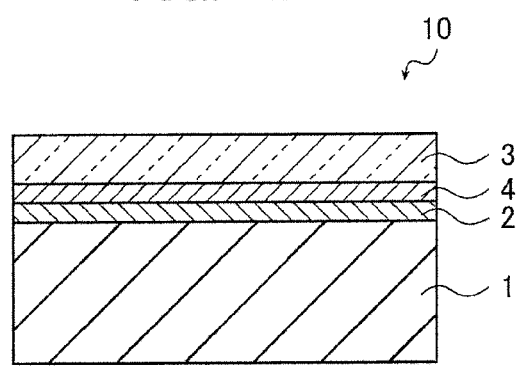
Figure 1C:
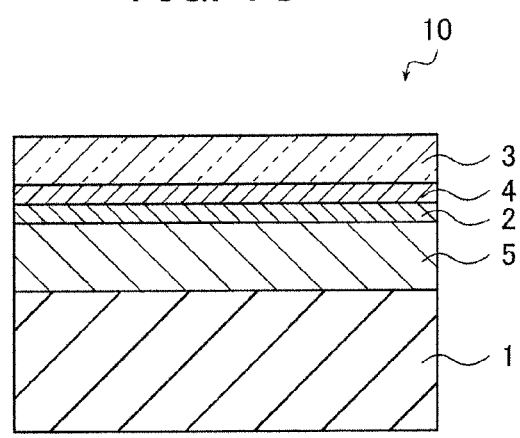

As shown in FIGS. 1A to 1C, a solar reflector plate 10 includes a substrate 1, a reflective layer 2 provided onto the substrate 1, and a protective layer 3 provided onto the reflective layer 2.

Moreover, as shown in FIG. 1B, the solar reflector plate 10 may include an interlayer 4 between the reflective layer 2 and the protective layer 3.

In addition, as shown in FIG. 1C, a base layer 5 may be provided between the substrate 1 and the reflective layer 2.

Though the solar reflector plate 10 shown in FIG. 1 has a planar shape, the shape of the solar reflector plate is not limited to the planar shape, and may have a curved shape such as a trough shape (gutter shape), and a parabolic shape.

Next, regarding the respective constitutions of the solar reflector plate, the materials, formation methods, and the like will be described.

Substrate

The substrate that the solar reflector plate includes is not particularly limited and, for example, a substrate such as a steel sheet, a plastic sheet, a ceramic sheet, or a glass sheet can be used.

Among these, the steel sheet that can be suitably used is not particularly limited as long as it is a general steel sheet. However, a stainless steel sheet is preferable since it is excellent in corrosion resistance of the back surface or sheared surface, and a cold-rolled steel sheet or a steel sheet plated with zinc or the like is preferable in view of economics and for the reason that corrosion resistance can be improved by coating or the like.

It is preferable that the surface of the substrate be smooth in view of reducing the surface roughness of the reflective layer and protective layer described later.

The substrate surface may be smoothened by rolling, skin pass, polishing such as sandpaper polishing, electrolytic polishing and electrolytic compound polishing, a method of coating the substrate surface with an organic substance and/or an inorganic substance, a method of laminating a smooth film by using an adhesive, a method of pasting a smooth film by thermal lamination, and the like.

In addition, a sheet thickness of the substrate is preferably 10 mm or less in view of facilitating a curved shaping, and more preferably 6 mm or less, particularly in view of the workability of the curved shaping.

Reflective Layer

The reflective layer that the solar reflector plate has is not particularly limited as long as it is a reflective layer containing a metal.

Specific examples of the metal include aluminum (Al), silver (Ag), and the like having a high reflectance, and in view of economics, Al is preferable.

The content of the metal in the reflective layer is preferably 50% by mass or more, more preferably 80% by mass or more, and even more preferably 90% by mass or more, in view of improving the reflectance.

The method of depositing the reflective layer onto the substrate (a base layer if the solar reflector plate has the base layer described later) is not particularly limited and, for example, methods such as deposition, sputtering, electroplating, hot-dip coating, and non-electrolytic plating can be applied.

When deposition or sputtering is applied, the film thickness of the reflective layer is preferably 0.001 μm to 0.5 μm, and more preferably 0.01 μm to 0.2 μm, in view of reflectance improvement and uniformity.

Furthermore, when electroplating or hot-dip coating is applied, the film thickness of the reflective layer is preferably about 5 μm to 200 μm, and in view of reflectance improvement, it is preferable to reduce the surface roughness of plating by rolling, skin pass, polishing, and the like.

In addition, as the reflective layer, it is possible to use a film or a glass sheet onto which a metal such as Al or Ag has been deposited or sputtered. In such a case, the reflective layer can be pasted to the substrate by an adhesive or thermal lamination.

Specific examples of the film include films containing a resin as a main component such as a PET film, a polyester film, a polyethylene film, a polypropylene film, a polyolefin film, a polyvinyl chloride film, a polyvinylidene chloride film, an acrylic resin film, a polyvinyl alcohol film, a polycarbonate film, a polystyrene film, a polyacrylonitrile film, an ethylene-vinyl acetate copolymer film, an ethylene-vinyl alcohol copolymer film, an ethylene-methacrylic acid copolymer film, a nylon film, an ionomer film, and a silicone film.

Though not particularly limited, the surface roughness of the film is desirably low in view of the reflectance improvement. Specifically, the surface roughness is preferably 0.2 μm or less and more preferably 0.02 μm or less, in terms of an arithmetic mean roughness (Ra).

Moreover, though not particularly limited, the thickness of the film is preferably 1 μm or more, and more preferably 5 μm or more, in view of inhibiting the influence of the surface roughness of the substrate and improving the reflectance. Similarly, the thickness of the film is preferably 5000 μm or less, and more preferably 500 μm or less, in view of economics.

Meanwhile, the glass sheet is not particularly limited, but the surface roughness thereof is preferably 0.2 μm or less, and more preferably 0.02 μm or less, in terms of Ra.

Though the thickness of the glass sheet is not also particularly limited, the thickness is preferably 50 μm to 1000 μm, and more preferably 100 μm to 500 μm, in view of facilitating a curved shaping.

Protective Layer

The protective layer that the solar reflector plate has is a specific protective layer containing silicon (Si) and an organic substance.

It was believed that if a vitreous coat containing an inorganic substance as a main component is used as the protective layer, the protective layer is not easily scratched since it is formed of a hard material. However, we found that since the material is brittle, the protective layer is rather vulnerable to micro scratches caused by flying sand, and the transparency easily deteriorates.

Moreover, if silicone rubber or a silicone resin is used as the protective layer, the protective layer is easily scratched since the material is soft, and the sand resistance is inferior.

We found, however, that a protective layer which contains Si and an organic substance, and in which the content of Si (hereinafter, also called the "Si content") is a specific value, and the number of oxygen (O) atoms binding to Si (hereinafter, also called the "Si-bound oxygen atom number") is a specific value can maintain an excellent reflectance of the reflective layer and greatly improve sand resistance and weather resistance.

Si Content

A content of Si in the protective layer is 10% by mass to 60% by mass, preferably 15% by mass to 50% by mass, and more preferably 20% by mass to 40% by mass in terms of $SiO_2$.

If the Si content is within the above range, sand resistance and weather resistance become excellent. We believe that this is because the hardness resulting from Si is excellently balanced with the flexibility resulting from the organic substance.

The Si content in the protective layer can be quantitated by fluorescence X-ray analysis or ICP-AES analysis. In ICP-AES analysis, a method of performing analysis by peeling or scraping off the protective layer can be used, and a portion accounting for about 50% or more of the thickness from the surface layer may be analyzed and used as a representative. In addition, when the protective layer is a thin film, sometimes the reflective layer or substrate may be mixed into the sample for analysis. However, if these (the mixed reflective layer or substrate) are quantitated by analysis and subtracted, the Si content of the protective layer can be quantitated.

There is a possibility that Si and the organic substance may be dispersed (mixed) while forming a sea-island structure, and any of Si and the organic substance may form the portion corresponding to the island.

Moreover, in the dispersed state of Si and the organic substance, it is preferable that the portions corresponding to the islands be fine, since the sand resistance becomes better in this structure. Specifically, the diameter of the portions is preferably 100 nm or less, and more preferably 50 nm or less.

Furthermore, Si and the organic substance are preferably a complex or a hybrid forming a chemical bond at the molecular level, since the transparency increases.

Si-bound Oxygen Atom Number

The Si-bound oxygen atom number in the protective layer is 1.5 to 3.2, and preferably 1.7 to 2.7 on average.

If the Si-bound oxygen atom number is within the above range, sand resistance and weather resistance become excellent. It is considered that this is because crosslinking proceeds suitably, and an appropriate molecular structure is formed.

The average number of oxygen atoms forming a chemical bond with one Si atom refers to a value confirmed by solid-state NMR (Dipolar Decoupling method), and can be measured using, for example, JNM-ECA series manufactured by JEOL Ltd.

As such a protective layer, for example, it is possible to use a silicone-based compound (silicone-based resin) in which a siloxane bond has been generated by crosslinking (curing) of a silane compound containing an alkoxysilyl group or a silanol group.

Examples of the silane compound include monofunctional $R_3Si(OR)_1$, bifunctional $R_2Si(OR)_2$, trifunctional $R_1Si(OR)_3$, and tetrafunctional $Si(OR)_4$ (in each formula, R represents a hydrogen atom or an organic group). If the respective silane compounds differing in the number of functional group are used in an appropriate combination, the Si-bound oxygen atom number described above can be adjusted.

Specific examples of the raw material (silane compound) of the silicone-based resin as the protective layer include tetraalkoxysilanes such as tetramethoxysilane and tetraethoxysi-lane; trialkoxysilanes such as methyltrimethoxysilane, phenyltrimethoxysilane, methyltriethoxy-silane, phenyltriethoxysilane, n-propyltrimethoxysilane, n-propyltriethoxysilane, hexyltrimethox-ysilane, hexyltriethoxysilane, decyltrimethoxysilane, trifluoropropyltrimethoxysilane, vinyltri-methoxysilane, vinyltriethoxysilane, 2-(3,4-epoxycyclohexyl)ethyltrimethoxysilane, 3-glycidoxypropyltrimethoxysilane, 3-glycidoxypropyltriethoxysilane, p-styryltrimethoxysilane, 3-acrylox-ypropyltrimethoxysilane, N-2-(aminoethyl)-3-aminopropyltrimethoxysilane, 3-aminopropyltrimethoxysilane, 3-ureidopropyltriethoxysilane, 3-mercaptopropyltrimethoxysilane, bis(triethoxy-silylpropyl)tetrasulfide, and 3-isocyanatopropyltriethoxysilane; dialkoxysilanes such as dimethyldimethoxysilane, dimethyldiethoxysilane, 3-glycidoxypropylmethyldimethoxysilane, 3-glycid-oxypropylmethyldiethoxysilane, 3-methacryloxypropylmethyldimethoxysilane, N-2-(aminoethyl)-3-aminopropylmethyldimethoxysilane, and 3-mercaptopropylmethyldimethoxysilane; chloro-silanes such as methyltrichlorosilane, dimethyldichlorosilane, trimethylchlorosilane, phenyltri-chlorosilane, trimethylsilyl chloride, and triethylsilyl chloride; silazanes such as hexamethyldisi-lazane; and the like. One kind of these may be used alone, or two or more kinds thereof may be used concurrently.

The organic substance in the protective layer is not particularly limited and may be derived from, for example, the functional group (for example, an alkyl group, a phenyl group, an epoxy group, a vinyl group, a methacryloyl group, or an acryloyl group) that the above-described silane compound has. In view of adjusting the Si content, the organic substance may be an epoxy resin, an acrylic resin, a polyester resin, an olefin-based resin, and the like that are mixed or made into a complex with the silane compound not having been crosslinked or with the silicone-based resin having been crosslinked.

When such a resin is used as the organic substance, the organic substance may be optionally cured by heating or ultraviolet rays.

Other examples of the organic substance in the protective layer include an organic filler, a resin stabilizer, and the like, in view of improving handling ability such as slipperiness and improving coating hardness.

Specific examples of the organic filler include polystyrene, polyacrylate, and the like. One kind of these may be used alone, or two or more kinds thereof may be used concurrently.

Specific examples of the resin stabilizer include a hindered amine-based light stabilizer; a benzotriazole-based ultraviolet absorber; an antioxidant based on phenol, phosphorus, or sulfur; and the like. One kind of these may be used alone, or two or more kinds thereof used concurrently.

The protective layer may contain other components in addition to Si and the organic substance. For example, in view of improving handling ability such as slipperiness and improving coating hardness, the protective layer may contain an inorganic filler.

Specific examples of the inorganic filler include titanium oxide, calcium carbonate, zirconium oxide, alumina, magnesium oxide, zinc oxide, barium sulfate, calcium phosphate, and the like. One kind of these may be used alone, or two or more kinds thereof may be used concurrently.

When the protective layer contains other components in addition to Si and the organic substance, the content of the components is not particularly limited as long as it is within a range that does not diminish the effect of our plates. However, the content is preferably about 15% or less in the protective layer.

An elastic modulus of the protective layer is preferably 0.10 GPa to 15 GPa, and more preferably 0.5 GPa to 10 GPa, since sand resistance becomes better.

The elastic modulus can be measured using, for example, a Picodenter HM500 manufactured by Fischer Instruments K.K.

Moreover, though not particularly limited, A surface profile of the protective layer is preferably smooth, in view of light condensation rate.

A surface roughness of the protective layer is preferably 0.10 μm or less in terms of an arithmetic mean roughness (Ra), since reflecting components diffused are reduced, and a regular reflectance can be maintained at a higher value. Ra can be measured based on JIS B0601 (2001).

The surface roughness of the protective layer can be adjusted to some extent by controlling surface profiles of the substrate or the reflective layer. Accordingly, to reduce the surface roughness of the protective layer, it is effective to reduce beforehand the surface roughness of the substrate or the reflective layer.

Furthermore, the surface roughness of the protective layer can also be adjusted by a method such as reducing a viscosity of a coating liquid for forming the protective layer, or increasing time allowed to elapse before curing is performed.

In addition, a method is also effective in which coating is performed by diluting the components with a solvent such as acetone, toluene, ethyl ether, methyl cellosolve, cellosolve, butyl cellosolve (ethylene glycol monobutyl ether), ethanol, isopropyl alcohol, propylene glycol 1-monomethyl ether 2-acetate, or water. A solid content concentration at that time is preferably about 0.5% by mass to 50% by mass.

Moreover, the thickness of the protective layer is not particularly limited. However, in view of balance between the reflectance and protection, the thickness is preferably 0.01 µm to 20 µm, more preferably 0.01 µm to 10 µm, and particularly preferably 0.1 µm to 5 µm.

Interlayer

It is preferable that the solar reflector plate include an interlayer between the reflective layer and the protective layer since the adhesiveness of the protective layer is improved, and the weather resistance becomes better in this manner.

The interlayer contains at least one kind selected from a group consisting of a silane coupling agent, a titanium coupling agent, a zirconium coupling agent, and an organic resin.

In addition, when a silane coupling agent, a titanium coupling agent, or a zirconium coupling agent is used, a film thickness of the interlayer is preferably about a thickness at a monolayer level (several angstroms) to 0.5 µm. When an organic resin is used, the thickness is preferably about 0.1 µm to 5 µm.

Examples of the silane coupling agent include alkoxysilanes having a functional group such as a vinyl group, an epoxy group, a styryl group, a methacryloyl group, an acryloyl group, an amino group, a ureide group, a mercapto group, a sulfide group, or an isocyanate group.

Examples of the titanium coupling agent include titanium tetraisopropoxide, titanium tetra-n-butoxide, titanium butoxide dimer, titanium tetra-2-ethylhexoxide, and the like.

Examples of the zirconium coupling agent include zirconium acetate, zirconium ammonium carbonate, zirconium fluoride, and the like.

Among these, a silane coupling agent is preferable since it has excellent compatibility with the protective layer and makes it possible to improve the weather resistance and maintain the excellent reflectance of the reflective layer at a higher degree.

When a silane coupling agent is used as the interlayer, the interlayer may be regarded as a portion of the protective layer, and an amount of the silane coupling agent that is expressed in terms of $SiO_2$ can be added to the Si content of the protective layer.

Meanwhile, as an organic resin, for example, a vinyl chloride resin, a vinyl chloride acetate resin, an acrylic resin, a modified olefin resin, a polyester resin, a polycarbonate resin, and the like having excellent transparency and light resistance can be used.

Base Layer

It is preferable that in the solar reflector plate, at least one base layer constituted with an organic material and/or an inorganic material be provided between the substrate and the reflective layer, since the smoothness of the reflective layer is improved, and the reflectance is heightened in this manner.

Specific examples of the base layer constituted with an organic material include films containing a resin as a main component such as a PET film, a polyester film, a polyethylene film, a polypropylene film, a polyolefin film, a polyvinyl chloride film, a polyvinylidene chloride film, an acrylic resin film, a polyvinyl alcohol film, a polycarbonate film, a polystyrene film, a polyacrylonitrile film, an ethylene-vinyl acetate copolymer film, an ethylene-vinyl alcohol copolymer film, an ethylene-methacrylic acid copolymer film, a nylon film, an ionomer film, a silicone film, and the like.

Specific examples of the base layer constituted with an inorganic material include a glass sheet, a glass coat, metal plating such as nickel or zinc, and the like.

EXAMPLES

Hereinafter, our plates will be described in detail based on examples, but this disclosure is not limited to such examples.

Examples 1 to 71 and Comparative Examples 1 to 16

On the substrate shown in Tables 1 to 3, the base layer, reflective layer, interlayer, and protective layer shown in Tables 1 to 3 were formed by the following method, thereby preparing solar reflector plates.

In Tables 1 to 3, a cell marked with "-" indicates that the corresponding item is not provided (not treated). Moreover, as the substrate shown in Tables 1 to 3, specifically the following substrates were used. When any of a stainless steel sheet, a cold-rolled steel sheet, a hot-dip galvanized steel sheet, and an electrogalvanized steel sheet was used as the substrate, the substrate surface on which the reflective layer would be formed was subjected to skin pass finishing.

Substrate

Stainless steel sheet: SUS430 (sheet thickness 0.1 mm)
Cold-rolled steel sheet: SPCC (sheet thickness 0.35 mm)
Plastic substrate: vinyl chloride (sheet thickness 5 mm)
Ceramic substrate: fiber-reinforced cement sheet [flexible board (sheet thickness 5 mm, manufactured by Mitsubishi Materials Corporation.)
Glass substrate: float sheet glass (sheet thickness 5 mm, manufactured by ASAHI GLASS CO., LTD.)
Hot-dip galvanized steel sheet (sheet thickness 0.30 mm, both side plating, amount of plating deposit on each side: 100 g/m$^2$)
Electrogalvanized steel sheet (sheet thickness 0.45 mm, both side plating, amount of plating deposit on each side: 20 g/m$^2$)

Base Layer

The base layer was pasted to the substrate by using an adhesive.

As a PET film for the base layer, a film having an arithmetic mean roughness (Ra) of 0.1 µm and a thickness described in Tables 1 to 3 (50 µm if the thickness is not described in Tables 1 to 3) was used.

As a glass sheet for the base layer used in Example 50, AN100 (sheet thickness 0.5 mm) manufactured by ASAHI GLASS CO., LTD. was used.

As a glass coat for the base layer used in Example 54, a glass coat was used which was obtained by firing powdered glass for a low-temperature seal (BAS115, manufactured by ASAHI GLASS CO., LTD.) for 30 minutes at 500° C. to yield a thickness of 100 µm.

Reflective Layer

The reflective layer was formed by depositing Al or Ag shown in Tables 1 to 3 onto the base layer. Further, regarding Example 60, the reflective layer was formed in a manner in which melted Al was plated onto the base layer such that the thickness thereof became 100 µm, and then mirror polishing was performed until the thickness thereof became 80 µm.

The thickness of the reflective layers not described in Tables 1 to 3 was 0.1 µm.

Interlayer

The interlayer was formed in a manner in which a 0.5% by mass aqueous solution in which the silane coupling agent or the like shown in Tables 1 to 3 was dissolved was coated onto the reflective layer at 10 g/m$^2$, followed by drying for 5 minutes at 110° C. The thickness of the respective interlayers was as described in Tables 1 to 3.

3-glycidoxypropyltrimethoxysilane was used as a silane coupling agent, titanium tetraisopropoxide was used as a titanium coupling agent, and zirconium ammonium carbonate was used as a zirconium coupling agent.

Moreover, as the silane coupling agent marked with "#,"3-aminopropyltrimethoxysilane was used.

Protective Layer

The protective layer was formed in a manner in which a coating liquid (solid content concentration 10% by mass), which was obtained by mixing the compounding agent shown in Table 4 and the curing agent shown in Table 5 with a solvent (ethylene glycol monobutyl ether) such that a mass ratio between them became the value shown in Tables 1 to 3, was coated onto the reflective layer (interlayer when the interlayer was provided) by using a bar coater, followed by heating and drying under the curing conditions shown in Tables 1 to 3. Regarding Comparative Examples 10 to 14, the compounding agents shown in Table 4 and the curing agents shown in Table 5 were not used, and the silicone rubber (RTV rubber KE-1842, curing conditions: 120° C.×1 hr, thickness 1 µm, manufactured by Shin-Etsu Chemical Co., Ltd.), a silicone resin (KR-300, curing conditions: 250° C.×1 hr, thickness 1 µm, manufactured by Shin-Etsu Chemical Co., Ltd.), a SiO$_2$ deposition film, borosilicate glass, and metal silicate (lithium silicate LSS45, manufactured by NISSAN CHEMICAL INDUSTRIES, LTD.) were respectively used as shown in Table 1 to form the protective layer.

Regarding the formed protective layer, the Si content (expressed in terms of SiO$_2$) was quantitated by alkali fusion/ICP-AES analysis by peeling the protective layer or scraping off the protective layer from the surface layer. The Si-bound oxygen atom number was calculated from chemical shift of solid-state NMR (JNM-ECA series, manufactured by JEOL Ltd.). The results of these are shown in Tables 1 to 3 together with the measurement results of the elastic modulus, thickness, and arithmetic mean roughness (Ra).

The respective solar reflector plates prepared were evaluated in terms of the reflectance, sand resistance, and weather resistance by the evaluation methods shown below. These results are shown in Tables 1 to 3.

Reflectance

By using a spectrophotometer (UV-3100PC, manufactured by Shimadzu Corporation), a regular reflectance at a wavelength of 300 nm to 2500 nm was measured and evaluated as a solar radiation reflectance multiplied by a weighting coefficient based on JIS K5602 (2008). A reflectance of 70% or higher was regarded as pass.

Sand Resistance

Based on JIS H8503 (1989), a reduction rate of the regular reflectance at the time when 2 kg of silicon carbide was dropped on the test surface was evaluated.

Criteria for Judgment
1: 5% or less (pass)
2: higher than 5% to 10% or less (pass)
3: higher than 10% to 30% or less (failure)
4: higher than 30% (failure)

Weather Resistance

Based on JIS D0205 (1987), a reduction rate of the regular reflectance at the time when a sunshine weather test was performed for 1000 hours was evaluated.

Criteria for Judgment
1: 5% or less (pass)
2: higher than 5% to 10% or less (pass)
3: higher than 10% to 30% or less (failure)
4: higher than 30% (failure)

TABLE 1

| | Substrate | Base layer | Reflective layer | Interlayer Type | Interlayer Thickness μm | Protective layer A | B | C | D | E | F | G | V | W | Other | SiO₂ Converted % | SiOₙ Number of n | Elastic modulus GPa | Thickness μm | Ra μm | Curing conditions | Reflectance (%) | Sand resistance | Weather resistance |
|---|---|---|---|---|---|---|---|---|---|---|---|---|---|---|---|---|---|---|---|---|---|---|---|---|
| | | | | | | | | | | Parts by mass | | | | | | | | | | | | | | |
| Comparative Example 1 | Stainless steel sheet | PET | Al | Silicone-based compound | — | | | | | 100 | 960 | 48 | | | | 5 | 2.0 | 1.2 | 1.0 | 0.01 | 100° C. × 1 hr | 86.2 | 4 | 4 |
| Comparative Example 2 | Stainless steel sheet | PET | Al | Silicone-based compound | — | | | | | 100 | 590 | 29.5 | | | | 8 | 2.0 | 1.6 | 1.0 | 0.01 | 100° C. × 1 hr | 85.9 | 3 | 3 |
| Example 1 | Stainless steel sheet | PET | Al | Silicone-based compound | — | | | | | 100 | 460 | 23 | | | | 10 | 2.0 | 2.1 | 1.0 | 0.01 | 100° C. × 1 hr | 87.1 | 2 | 2 |
| Example 2 | Stainless steel sheet | PET | Al | Silicone-based compound | — | | | | | 100 | 300 | 15 | | | | 14 | 2.0 | 2.3 | 1.0 | 0.01 | 100° C. × 1 hr | 88.6 | 1 | 2 |
| Example 3 | Stainless steel sheet | PET | Al | Silicone-based compound | — | | | | | 100 | 210 | 10.5 | | | | 19 | 2.0 | 2.8 | 1.0 | 0.01 | 100° C. × 1 hr | 88.4 | 1 | 2 |
| Example 4 | Stainless steel sheet | PET | Al | Silicone-based compound | — | | | | | 100 | 130 | 6.5 | | | | 29 | 2.0 | 2.9 | 1.0 | 0.01 | 100° C. × 1 hr | 89.9 | 1 | 2 |
| Example 5 | Stainless steel sheet | PET | Al | Silicone-based compound | — | | | | | 100 | 90 | 4.5 | | | | 38 | 2.0 | 3.0 | 1.0 | 0.01 | 100° C. × 1 hr | 88.2 | 1 | 2 |
| Example 6 | Stainless steel sheet | PET | Al | Silicone-based compound | — | | | | | 100 | 63 | 3.15 | | | | 49 | 2.0 | 3.2 | 1.0 | 0.01 | 100° C. × 1 hr | 88.0 | 1 | 2 |

TABLE 1-continued

| Substrate | Base layer | Reflective layer | Interlayer Type | Interlayer Thickness μm | A | B | C | D | E | F | G | V | W | Other | SiO₂ Converted % | SiOₙ Number of n | Elastic modulus GPa | Thickness μm | Ra μm | Curing conditions | Reflectance (%) | Sand resistance | Weather resistance |
|---|---|---|---|---|---|---|---|---|---|---|---|---|---|---|---|---|---|---|---|---|---|---|---|
| Example 7 | Stainless steel sheet | PET | Al | Silicone-based compound | — | | | | | 100 | | 47 | 2.35 | | | 58 | 2.0 | 3.1 | 1.0 | 0.01 | 100° C. × 1 hr | 87.8 | 2 | 2 |
| Comparative Example 3 | Stainless steel sheet | PET | Al | Silicone-based compound | — | | | | | 100 | | 35 | 1.75 | | | 68 | 2.0 | 2.8 | 1.0 | 0.01 | 100° C. × 1 hr | 86.4 | 3 | 2 |
| Comparative Example 4 | Stainless steel sheet | PET | Al | Silicone-based compound | — | | | | | 100 | | 30 | 1.5 | | | 73 | 2.0 | 2.3 | 1.0 | 0.01 | 100° C. × 1 hr | 87.5 | 4 | 3 |
| Comparative Example 5 | Stainless steel sheet | PET | Al | Silicone-based compound | — | | | | | 100 | 170 | 300 | 15 | | | 29 | 1.2 | 0.1 | 1.0 | 0.01 | 100° C. × 1 hr | 85.9 | 4 | 4 |
| Comparative Example 6 | Stainless steel sheet | PET | Al | Silicone-based compound | — | | | | | 100 | 120 | 250 | 12.5 | | | 29 | 1.3 | 0.4 | 1.0 | 0.01 | 100° C. × 1 hr | 87.3 | 3 | 3 |
| Example 8 | Stainless steel sheet | PET | Al | Silicone-based compound | — | | | | | 100 | 50 | 180 | 9 | | | 29 | 1.5 | 0.7 | 1.0 | 0.01 | 100° C. × 1 hr | 89.1 | 2 | 2 |
| Example 9 | Stainless steel sheet | PET | Al | Silicone-based compound | — | | | | | 100 | 20 | 150 | 7.5 | | | 29 | 1.7 | 1.2 | 1.0 | 0.01 | 100° C. × 1 hr | 88.7 | 1 | 2 |
| Example 10 | Stainless steel sheet | PET | Al | Silicone-based compound | — | | | | 50 | 100 | | 185 | 9.25 | | | 29 | 2.3 | 2.5 | 1.0 | 0.01 | 100° C. × 1 hr | 87.9 | 1 | 2 |
| Example 11 | Stainless steel sheet | PET | Al | Silicone-based compound | — | | | | 200 | 100 | | 350 | 17.5 | | | 29 | 2.7 | 2.9 | 1.0 | 0.01 | 100° C. × 1 hr | 87.6 | 1 | 2 |

TABLE 1-continued

| | | Interlayer | | | Protective layer | | | | | | | | | | | | | Characteristics | | |
| | | | | | | Parts by mass | | | | | | | SiO$_2$ Converted % | SiO$_n$ Number of n | Elastic modulus GPa | Thickness μm | Ra μm | Curing conditions | Reflectance (%) | Sand resistance | Weather resistance |
| | Substrate | Base layer | Reflective layer | Type | Thickness μm | | A | B | C | D | E | F | G | V | W | Other | | | | | | | | |
|---|---|---|---|---|---|---|---|---|---|---|---|---|---|---|---|---|---|---|---|---|---|---|---|---|
| Example 12 | Stainless steel sheet | PET | Al | — | — | Silicone-based compound | | | 600 | | 100 | | 795 | 39.75 | | | 29 | 2.9 | 4.4 | 1.0 | 0.01 | 100° C. × 1 hr | 87.4 | 2 | 2 |
| Example 13 | Stainless steel sheet | PET | Al | — | — | Silicone-based compound | 30 | | 100 | | | | 135 | 6.75 | | | 29 | 3.2 | 5.0 | 1.0 | 0.01 | 100° C. × 1 hr | 86.2 | 2 | 2 |
| Comparative Example 7 | Stainless steel sheet | PET | Al | — | — | Silicone-based compound | 60 | | 100 | | | | 160 | 8 | | | 29 | 3.4 | 6.8 | 1.0 | 0.01 | 100° C. × 1 hr | 85.9 | 3 | 2 |
| Comparative Example 8 | Stainless steel sheet | PET | Al | — | — | Silicone-based compound | 120 | | 100 | | | | 220 | 11 | | | 29 | 3.6 | 11 | 1.0 | 0.01 | 100° C. × 1 hr | 85.4 | 4 | 3 |
| Comparative Example 9 | Stainless steel sheet | PET | Al | — | — | Silicone-based compound | 300 | | 100 | | | | 390 | 19.5 | | | 29 | 3.8 | 15 | 1.0 | 0.01 | 100° C. × 1 hr | 85.6 | 4 | 4 |
| Example 14 | Cold-rolled steel sheet | PET | Al | Silane coupling agent | ≤0.1 | Silicone-based compound | | | | | 100 | | 130 | | | | 30 | 2.0 | 0.01 | 1.0 | 0.01 | 100° C. × 1 hr | 86.7 | 2 | 2 |
| Example 15 | Cold-rolled steel sheet | PET | Al | Silane coupling agent | ≤0.1 | Silicone-based compound | | | | | 100 | | 130 | 0.013 | | | 30 | 2.0 | 0.05 | 1.0 | 0.01 | 100° C. × 1 hr | 86.9 | 2 | 2 |
| Example 16 | Cold-rolled steel sheet | PET | Al | Silane coupling agent | ≤0.1 | Silicone-based compound | | | | | 100 | | 130 | 0.13 | | | 30 | 2.0 | 0.1 | 1.0 | 0.01 | 100° C. × 1 hr | 88.5 | 1 | 2 |
| Example 17 | Cold-rolled steel sheet | PET | Al | Silane coupling agent | ≤0.1 | Silicone-based compound | | | | | 100 | | 130 | 1.3 | | | 30 | 2.0 | 0.5 | 1.0 | 0.01 | 100° C. × 1 hr | 89.4 | 1 | 1 |

TABLE 1-continued

| | Substrate | Interlayer | | | Protective layer | | | | | | | | | | | | | Characteristics | | |
|---|---|---|---|---|---|---|---|---|---|---|---|---|---|---|---|---|---|---|---|---|
| | | Base layer | Reflective layer | Type | Thickness μm | | A | B | C | D | E | F | G | V | W | Other | SiO₂ Converted % | SiOₙ Number of n | Elastic modulus GPa | Thickness μm | Ra μm | Curing conditions | Reflectance (%) | Sand resistance | Weather resistance |

| | Substrate | Base layer | Reflective layer | Interlayer Type | Interlayer Thickness μm | A | B | C | D | E | F | G | V | W | Other | SiO₂ Converted % | SiOₙ n | Elastic modulus GPa | Thickness μm | Ra μm | Curing conditions | Reflectance (%) | Sand resistance | Weather resistance |
|---|---|---|---|---|---|---|---|---|---|---|---|---|---|---|---|---|---|---|---|---|---|---|---|---|
| Example 18 | Cold-rolled steel sheet | PET | Al | Silane coupling agent | ≤0.1 | | | | | 100 | | 130 | 7.8 | | | 29 | 2.0 | 7.0 | 1.0 | 0.01 | 100° C. × 1 hr | 89.4 | 1 | 1 |
| Example 19 | Cold-rolled steel sheet | PET | Al | Silane coupling agent | ≤0.1 | | | | | 100 | | 130 | 9.1 | | | 28 | 2.0 | 10 | 1.0 | 0.01 | 100° C. × 1 hr | 89.4 | 1 | 1 |
| Example 20 | Cold-rolled steel sheet | PET | Al | Silane coupling agent | ≤0.1 | | | | | 100 | | 130 | 10.4 | | | 28 | 2.0 | 15 | 1.0 | 0.01 | 100° C. × 1 hr | 88.4 | 1 | 2 |
| Example 21 | Cold-rolled steel sheet | PET | Al | Silane coupling agent | ≤0.1 | | | | | 100 | | 130 | 13 | | | 28 | 2.0 | 20 | 1.0 | 0.01 | 100° C. × 1 hr | 85.1 | 2 | 2 |
| Example 22 | Stainless steel sheet | PET | Al | — | — | | | | | 100 | | 130 | | | 39 | 24 | 2.0 | 0.4 | 1.0 | 0.01 | 120° C. × 24 hr | 88.6 | 1 | 2 |
| Example 23 | Stainless steel sheet | PET | Al | — | — | | | | | 100 | | 130 | | | 176 | 15 | 2.0 | 2.9 | 1.0 | 0.01 | 120° C. × 24 hr | 87.9 | 1 | 2 |
| Comparative Example 10 | Stainless steel sheet | PET | Al | Silicone rubber | — | | | | | | | | | | | 75 | 2.0 | 0.1 | 1.0 | 0.01 | — | 75.4 | 4 | 4 |
| Comparative Example 11 | Stainless steel sheet | PET | Al | Silicone resin | — | | | | | | | | | | | 78 | 3.0 | 2.0 | 1.0 | 0.01 | — | 81.1 | 4 | 4 |
| Comparative Example 12 | Stainless steel sheet | PET | Al | SiO₂ Deposition film | — | | | | | | | | | | | 100 | 4.0 | 90 | 0.1 | 0.01 | — | 89.9 | 3 | 4 |

TABLE 1-continued

| | Substrate | Base layer | Reflective layer | Interlayer Type | Interlayer Thickness μm | Protective layer A | B | C | D | E | F | G Parts by mass | V | W | Other | SiO₂ Converted % | SiOₙ Number of n | Elastic modulus GPa | Thickness μm | Ra μm | Curing conditions | Reflectance (%) | Sand resistance | Weather resistance |
|---|---|---|---|---|---|---|---|---|---|---|---|---|---|---|---|---|---|---|---|---|---|---|---|---|
| Comparative Example 13 | Stainless steel sheet | PET | Al | — | — | | | | | | | | | | Borosilicate glass | 60 | 4.0 | 70 | 10.0 | 0.01 | — | 86.6 | 3 | 4 |
| Comparative Example 14 | Stainless steel sheet | PET | Al | — | — | | | | | | | | | | Metal silicate | 70 | 4.0 | 70 | 1.0 | 0.01 | — | 87.6 | 3 | 4 |

TABLE 2

| | | | Interlayer | | Protective layer | | | | | | | | | | | | Characteristics | | |
|---|---|---|---|---|---|---|---|---|---|---|---|---|---|---|---|---|---|---|---|
| | Substrate | Base layer | Reflective layer | Type | Thickness μm | A | B | C | D | E | F G | V W Other | SiO$_2$ Converted % | SiO$_n$ Number of n | Elastic modulus GPa | Thickness μm | Ra μm | Curing conditions | Reflectance (%) | Sand resistance | Weather resistance |
| Example 24 | Stainless steel sheet | PET | Al | Silane coupling agent | ≤0.1 | Silicone-based compound | | | | 100 | 130 | 6.5 | 29 | 2.0 | 2.7 | 1.0 | 0.01 | 100° C. × 1 hr | 88.7 | 1 | 1 |
| Example 25 | Stainless steel sheet | PET | Al | Titanium coupling agent | ≤0.1 | Silicone-based compound | | | | 100 | 130 | 6.5 | 29 | 2.0 | 3.1 | 1.0 | 0.01 | 100° C. × 1 hr | 87.6 | 1 | 1 |
| Example 26 | Stainless steel sheet | PET | Al | Zr coupling agent | ≤0.1 | Silicone-based compound | | | | 100 | 130 | 6.5 | 29 | 2.0 | 3.0 | 1.0 | 0.01 | 100° C. × 1 hr | 88.5 | 1 | 1 |
| Example 27 | Stainless steel sheet | PET | Al | Vinyl chloride acetate resin | 0.5 | Silicone-based compound | | | | 100 | 130 | 6.5 | 29 | 2.0 | 2.6 | 1.0 | 0.01 | 100° C. × 1 hr | 86.2 | 1 | 1 |
| Example 28 | Stainless steel sheet | PET | Al | Vinyl chloride acetate resin | 1 | Silicone-based compound | | | | 100 | 130 | 6.5 | 29 | 2.0 | 2.6 | 1.0 | 0.01 | 100° C. × 1 hr | 85.8 | 1 | 1 |
| Example 29 | Stainless steel sheet | PET | Al | Vinyl chloride acetate resin | 2 | Silicone-based compound | | | | 100 | 130 | 6.5 | 29 | 2.0 | 2.6 | 1.0 | 0.01 | 100° C. × 1 hr | 83.4 | 1 | 1 |
| Example 30 | Stainless steel sheet | PET | Al | Vinyl chloride acetate resin | 5 | Silicone-based compound | | | | 100 | 130 | 6.5 | 29 | 2.0 | 2.6 | 1.0 | 0.01 | 100° C. × 1 hr | 81.1 | 1 | 1 |
| Example 31 | Stainless steel sheet | PET | Al | Acrylic resin | 0.5 | Silicone-based compound | | | | 100 | 130 | 6.5 | 29 | 2.0 | 3.3 | 1.0 | 0.01 | 100° C. × 1 hr | 86.1 | 1 | 1 |
| Example 32 | Cold-rolled steel sheet | PET | Al | — | — | Silicone-based compound | | | | 100 | 130 | 6.5 | 29 | 2.0 | 2.6 | 1.0 | 0.01 | 100° C. × 1 hr | 89.7 | 1 | 2 |
| Example 33 | Cold-rolled steel sheet | PET | Al | Silane coupling agent | ≤0.1 | Silicone-based compound | | | | 100 | 130 | 6.5 | 29 | 2.0 | 2.6 | 0.01 | 0.01 | 100° C. × 1 hr | 90.0 | 2 | 2 |

TABLE 2-continued

| | | | Interlayer | | | Protective layer | | | | | | | | | | | | | | | | Characteristics | | |
|---|---|---|---|---|---|---|---|---|---|---|---|---|---|---|---|---|---|---|---|---|---|---|---|---|
| | Substrate | Base layer | Reflective layer | Type | Thickness μm | | A | B | C | D | E | F | G | V | W | Other | SiO$_2$ Converted % | SiO$_n$ Number of n | Elastic modulus GPa | Thickness μm | Ra μm | Curing conditions | Reflectance (%) | Sand resistance | Weather resistance |
| | | | | | | | Parts by mass | | | | | | | | | | | | | | | | | | |
| Example 34 | Cold-rolled steel sheet | PET | Al | Silane coupling agent | ≤0.1 | Silicone-based compound | | | | | 100 | | 130 | | 6.5 | | 29 | 2.0 | 2.6 | 0.1 | 0.01 | 100° C. × 1 hr | 89.9 | 1 | 2 |
| Example 35 | Cold-Rolled steel sheet | PET | Al | Silane coupling agent | ≤0.1 | Silicone-based compound | | | | | 100 | | 130 | | 6.5 | | 29 | 2.0 | 2.6 | 1.0 | 0.01 | 100° C. × 1 hr | 88.7 | 1 | 2 |
| Example 36 | Cold-rolled steel sheet | PET | Al | Silane coupling agent | ≤0.1 | Silicone-based compound | | | | | 100 | | 130 | | 6.5 | | 29 | 2.0 | 2.6 | 10.0 | 0.01 | 100° C. × 1 hr | 87.8 | 1 | 2 |
| Example 37 | Cold-rolled steel sheet | PET | Al | Silane coupling agent | ≤0.1 | Silicone-based compound | | | | | 100 | | 130 | | 6.5 | | 29 | 2.0 | 2.6 | 20.0 | 0.01 | 100° C. × 1 hr | 82.3 | 1 | 2 |
| Example 38 | Cold-rolled steel sheet | PET | Al | Silane coupling agent | ≤0.1 | Silicone-based compound | | 50 | | | 100 | | 130 | | 6.5 | | 30 | 2.5 | 2.2 | 1.0 | 0.01 | 100° C. × 1 hr | 88.5 | 1 | 2 |
| Example 39 | Cold-rolled steel sheet | PET | Al | Silane coupling agent | ≤0.1 | Silicone-based compound | | 100 | | | | | 130 | | 6.5 | | 31 | 2.7 | 4.8 | 1.0 | 0.01 | 100° C. × 1 hr | 89.0 | 1 | 2 |
| Example 40 | Cold-rolled steel sheet | PET | Al | Silane coupling agent | ≤0.1 | Silicone-based compound | | | 100 | | | | 130 | | 6.5 | | 31 | 3.0 | 5.1 | 1.0 | 0.01 | 100° C. × 1 hr | 88.8 | 1 | 2 |
| Example 41 | Cold-rolled steel sheet | PET | Al | Silane coupling agent | ≤0.1 | Silicone-based compound | | | | 50 | 50 | | 130 | | 6 | | 12 | 2.0 | 2.1 | 1.0 | 0.01 | 100° C. × 1 hr | 89.1 | 1 | 2 |
| Example 42 | Cold-rolled steel sheet | PET | Al | Silane coupling agent | ≤0.1 | Silicone-based compound | | | | 100 | | | 15 | | 0.75 | | 31 | 2.0 | 2.3 | 1.0 | 0.01 | 100° C. × 1 hr | 89.7 | 1 | 2 |
| Example 43 | Cold-rolled steel sheet | PET (10 μm thickness) | Al | Silane coupling agent | ≤0.1 | Silicone-based compound | | | | | 100 | | 130 | | 6.5 | | 29 | 2.0 | 2.5 | 0.1 | 0.01 | 100° C. × 1 hr | 88.7 | 1 | 2 |
| Example 44 | Cold-rolled steel sheet | PET (100 μm thickness) | Al | Silane coupling agent | ≤0.1 | Silicone-based compound | | | | | 100 | | 130 | | 6.5 | | 29 | 2.0 | 2.4 | 0.1 | 0.01 | 100° C. × 1 hr | 90.2 | 1 | 2 |

TABLE 2-continued

| | Substrate | Base layer | Reflective layer | Interlayer Type | Interlayer Thickness μm | Protective layer A | B | C | D | E Parts by mass | F | G | V | W | Other | SiO₂ Converted % | SiO$_n$ Number of n | Elastic modulus GPa | Thickness μm | Ra μm | Curing conditions | Reflectance (%) | Sand resistance | Weather resistance |
|---|---|---|---|---|---|---|---|---|---|---|---|---|---|---|---|---|---|---|---|---|---|---|---|---|
| Example 45 | Cold-rolled steel sheet | PET | Al (0.01 μm Thickness) | Silane coupling agent | ≤0.1 | | | | | 100 | | 130 | | 6.5 | Silicone-based compound | 29 | 2.0 | 2.6 | 0.1 | 0.01 | 100° C. × 1 hr | 78.6 | 1 | 2 |
| Example 46 | Cold-rolled steel sheet | PET | Al (0.05 μm thickness) | Silane coupling agent | ≤0.1 | | | | | 100 | | 130 | | 6.5 | Silicone-based compound | 29 | 2.0 | 2.6 | 0.1 | 0.01 | 100° C. × 1 hr | 85.3 | 1 | 2 |
| Example 47 | Cold-rolled steel sheet | PET | Al (0.2 μm thickness) | Silane coupling agent | ≤0.1 | | | | | 100 | | 130 | | 6.5 | Silicone-based compound | 29 | 2.0 | 2.6 | 0.1 | 0.01 | 100° C. × 1 hr | 88.4 | 1 | 2 |
| Example 48 | Cold-rolled steel sheet | PET | Ag | — | — | | | | | 100 | | 130 | | 6.5 | Silicone-based compound | 29 | 2.0 | 3.1 | 1.0 | 0.01 | 100° C. × 1 hr | 95.3 | 1 | 2 |
| Example 49 | Cold-rolled steel sheet | PET | Ag | Silane coupling agent | ≤0.1 | | | | | 100 | | 130 | | 6.5 | Silicone-based compound | 29 | 2.0 | 2.5 | 0.1 | 0.01 | 100° C. × 1 hr | 94.8 | 1 | 2 |
| Example 50 | Cold-rolled steel sheet | Glass sheet | Al | Silane coupling agent | ≤0.1 | | | | | 100 | | 130 | | 6.5 | Silicone-based compound | 29 | 2.0 | 2.6 | 10.0 | 0.01 | 100° C. × 1 hr | 90.1 | 1 | 2 |

TABLE 3

| | Substrate | Base layer | Reflective layer | Interlayer Type | Interlayer Thickness μm | Protective layer A | B | C | D | E | F | G | V | W | Other | SiO₂ Converted % | SiOₙ Number of n | Elastic modulus GPa | Thickness μm | Ra μm | Curing conditions | Characteristics Reflectance (%) | Sand resistance | Weather resistance |
|---|---|---|---|---|---|---|---|---|---|---|---|---|---|---|---|---|---|---|---|---|---|---|---|---|
| Example 51 | Plastic substrate | PET | Al | — | — | Silicone-based compound | | | | 100 | | 130 | 6.5 | | | 29 | 2.0 | 3.0 | 1.0 | 0.01 | 100° C. × 1 hr | 89.7 | 1 | 2 |
| Example 52 | Ceramic substrate | PET | Al | — | — | Silicone-based compound | | | | 100 | | 130 | 6.5 | | | 29 | 2.0 | 3.1 | 1.0 | 0.01 | 100° C. × 1 hr | 89.4 | 1 | 2 |
| Example 53 | Glass substrate | PET | Al | — | — | Silicone-based compound | | | | 100 | | 130 | 6.5 | | | 29 | 2.0 | 3.1 | 1.0 | 0.01 | 100° C. × 1 hr | 88.6 | 1 | 2 |
| Example 54 | Stainless steel sheet | Glass coat | Al | — | — | Silicone-based compound | | | | 100 | | 130 | 6.5 | | | 29 | 2.0 | 2.9 | 1.0 | 0.01 | 100° C. × 1 hr | 87.9 | 1 | 2 |
| Example 55 | Stainless steel sheet | — | Al | — | — | Silicone-based compound | | | | 100 | | 130 | 6.5 | | | 29 | 2.0 | 2.9 | 1.0 | 0.02 | 100° C. × 1 hr | 75.4 | 1 | 2 |
| Example 56 | Stainless steel sheet | PET | Al | — | — | Silicone-based compound | | | | 100 | | 130 | 6.5 | | | 29 | 2.0 | 3.1 | 1.0 | 0.05 | 100° C. × 1 hr | 85.1 | 1 | 2 |
| Example 57 | Stainless steel sheet | PET | Al | — | — | Silicone-based compound | | | | 100 | | 130 | 6.5 | | | 29 | 2.0 | 3.0 | 1.0 | 0.10 | 100° C. × 1 hr | 81.2 | 1 | 2 |
| Example 58 | Stainless steel sheet | PET | Al | — | — | Silicone-based compound | | | | 100 | | 130 | 6.5 | | | 29 | 2.0 | 3.1 | 1.0 | 0.30 | 100° C. × 1 hr | 75.4 | 1 | 2 |
| Example 59 | Stainless steel sheet | PET | Al | — | — | Silicone-based compound | | | | 100 | | 130 | 6.5 | | | 29 | 2.0 | 2.9 | 1.0 | 0.50 | 100° C. × 1 hr | 71.0 | 1 | 2 |
| Example 60 | Cold-rolled steel sheet | — | Melted Al (having a thickness of 80 μm by being subjected to mirror polishing) | — | — | Silicone-based compound | | | | 100 | | 130 | 6.5 | | | 29 | 2.0 | 2.6 | 1.0 | 0.01 | 100° C. × 1 hr | 84.7 | 1 | 2 |

TABLE 3-continued

| | Substrate | Base layer | Reflective layer | Interlayer Type | Interlayer Thickness μm | Interlayer | Protective layer A | B | C | D | E Parts by mass | F | G | V | W | Other | SiO₂ Converted % | SiO$_n$ Number of n | Elastic modulus GPa | Thickness μm | Ra μm | Curing conditions | Characteristics Reflectance (%) | Sand resistance | Weather resistance |
|---|---|---|---|---|---|---|---|---|---|---|---|---|---|---|---|---|---|---|---|---|---|---|---|---|---|
| Comparative Example 15 | Stainless steel sheet | — | — | — | — | — | | | | | | | | | | | | | | | | — | 50.7 | 4 | 4 |
| Comparative Example 16 | Cold-rolled steel sheet | — | — | — | — | — | | | | | | | | | | | | | | | | — | 34.3 | 4 | 4 |
| Example 61 | Hot-dip galvanized steel sheet | PET | Al | Silane coupling agent | ≤0.1 | Silicone-based compound | | | | | 100 | 130 | 6.5 | | | | 30 | 2.0 | 2.8 | 1.0 | 0.02 | 100° C. × 1 hr | 88.6 | 1 | 1 |
| Example 62 | Hot-dip galvanized steel sheet | PET | Al | Silane coupling agent | ≤0.1 | Silicone-based compound | | | | | 100 | 130 | 6.5 | | | | 30 | 2.0 | 2.7 | 5.0 | 0.01 | 100° C. × 1 hr | 88.5 | 1 | 1 |
| Example 63 | Hot-dip galvanized steel sheet | PET | Al | #Silane coupling agent | ≤0.1 | Silicone-based compound | | | | | 100 | 130 | 6.5 | | | | 30 | 2.0 | 2.8 | 1.0 | 0.01 | 100° C. × 1 hr | 88.7 | 1 | 1 |
| Example 64 | electro-galvanized steel sheet | PET | Al | Silane coupling agent | ≤0.1 | Silicone-based compound | | | | | 100 | 130 | 6.5 | | | | 30 | 2.0 | 2.9 | 1.0 | 0.01 | 100° C. × 1 hr | 88.9 | 1 | 1 |
| Example 65 | electro-galvanized steel sheet | PET | Al | Silane coupling agent | ≤0.1 | Silicone-based compound | | | | | 100 | 130 | 6.5 | | | | 30 | 2.0 | 2.7 | 5.0 | 0.01 | 100° C. × 1 hr | 88.4 | 1 | 1 |
| Example 66 | electro-galvanized steel sheet | PET | Al | #Silane coupling agent | ≤0.1 | Silicone-based compound | | | | | 100 | 130 | 6.5 | | | | 30 | 2.0 | 2.7 | 1.0 | 0.01 | 100° C. × 1 hr | 88.7 | 1 | 1 |
| Example 67 | Cold-rolled steel sheet | PET | Al | Silane coupling agent | ≤0.1 | Silicone-based compound | | | | | 100 | 130 | 0 | | | | 30 | 2.0 | 0.01 | 1.0 | 0.01 | 100° C. × 1 hr | 86.7 | 2 | 2 |
| Example 68 | Cold-rolled steel sheet | PET | Al | Silane coupling agent | ≤0.1 | Silicone-based compound | | | | | 100 | 130 | 0.013 | | | | 30 | 2.0 | 0.05 | 1.0 | 0.01 | 100° C. × 1 hr | 86.9 | 2 | 2 |

TABLE 3-continued

| | Substrate | Base layer | Reflective layer | Interlayer Type | Interlayer Thickness μm | Interlayer Silicone-based compound | Protective layer A B C D E F G Parts by mass | | | | | | | Protective layer V | Protective layer W | Protective layer Other | SiO$_2$ Converted % | SiO$_n$ Number of n | Elastic modulus GPa | Thickness μm | Ra μm | Curing conditions | Reflectance (%) | Sand resistance | Weather resistance |
|---|---|---|---|---|---|---|---|---|---|---|---|---|---|---|---|---|---|---|---|---|---|---|---|---|
| Example 69 | Cold-rolled steel sheet | PET | Al | Silane coupling agent | ≤0.1 | Silicone-based compound | | | | | 100 | 130 | | 7.8 | | X30 | 24 | 2.0 | 8.3 | 3.0 | 0.02 | 100° C. × 1 hr | 85.3 | 1 | 1 |
| Example 70 | Cold-rolled steel sheet | PET | Al | Silane coupling agent | ≤0.1 | Silicone-based compound | | | | | 100 | 130 | | 7.8 | | Y30 | 24 | 2.0 | 4.6 | 4.0 | 0.03 | 100° C. × 1 hr | 80.1 | 2 | 1 |
| Example 71 | Cold-rolled steel sheet | PET | Al | Silane coupling agent | ≤0.1 | Silicone-based compound | | | | | 100 | 130 | | 7.8 | | Z30 | 24 | 2.0 | 7.9 | 5.0 | 0.10 | 100° C. × 1 hr | 72.1 | 2 | 1 |

TABLE 4

| | Compounding agent |
|---|---|
| A | Tetramethoxysilane |
| B | 3-Glycidoxypropyltrimethoxysilane |
| C | Methyltrimethoxysilane |
| D | 3-Glycidoxypropylmethyldimethoxysilane |
| E | Dimethyldimethoxysilane |
| F | Trimethylsilyl chloride |
| G | 1,4-Butanediol diglycidyl ether |
| X | Titanium oxide (rutile type, particle size 10 nm) |
| Y | Calcium carbonate (particle size 0.2 µm) |
| Z | Zirconium oxide (particle size 0.6 µm) |

TABLE 5

| | Curing agent |
|---|---|
| V | Diethylenetriamine |
| W | A mixture of methyl hexahydrophthalic anhydride:tris(dimethylaminomethyl)phenol = 99:1 |

As the results described in Tables 1 to 3 clearly show, we found that if a protective layer in which either or both of the Si content (expressed in terms of $SiO_2$) and the Si-bound oxygen atom number are outside of a predetermined range is used, the reflectance can be maintained at a high value, but the sand resistance and weather resistance deteriorate (Comparative Examples 1 to 14).

On the other hand, we found that if a protective layer in which both the Si content (expressed in terms of $SiO_2$) and the Si-bound oxygen atom number are within a predetermined range is used, the excellent reflectance of the reflective layer is maintained, and the sand resistance and weather resistance also become excellent (Examples 1 to 71).

Particularly, we found that in the solar reflector plates prepared in Examples 14 to 21, 24 to 31, 33 to 47, 49 to 50, and 61 to 71 in which a stainless steel sheet, a cold-rolled steel sheet, a hot-dip galvanized steel sheet, or an electrogalvanized steel sheet is used as a substrate, and the interlayer is provided between the reflective layer and protective layer, the sand resistance and weather resistance (particularly, weather resistance) tend to further improve.

The invention claimed is:

1. A solar reflector plate comprising:
a substrate;
a reflective layer provided onto the substrate; and
a protective layer provided onto the reflective layer,
wherein the solar reflector plate has a laminated structure in which the substrate, the reflective layer and the protective layer are stacked in this order and are co-extensive with each other, and
the protective layer contains silicon in an amount of 10% by mass to 60% by mass in terms of $SiO_2$ and an organic substance, and has 1.5 to 3.2 oxygen atoms on average that form a chemical bond with silicon.

2. The solar reflector plate according to claim 1, wherein an elastic modulus of the protective layer is 0.1 GPa to 15 GPa.

3. The solar reflector plate according to claim 2, wherein the reflective layer contains aluminum and/or silver.

4. The solar reflector plate according to claim 3, further comprising an interlayer containing at least one selected from the group consisting of a silane coupling agent, a zirconium coupling agent, and an organic resin, between the reflective layer and the protective layer.

5. The solar reflector plate according to claim 4, further comprising at least one base layer constituted of an organic material and/or an inorganic material, between the substrate and the reflective layer.

6. The solar reflector plate according to claim 3, further comprising at least one base layer constituted of an organic material and/or an inorganic material, between the substrate and the reflective layer.

7. The solar reflector plate according to claim 2, further comprising an interlayer containing at least one selected from the group consisting of a silane coupling agent, a zirconium coupling agent, and an organic resin, between the reflective layer and the protective layer.

8. The solar reflector plate according to claim 7, further comprising at least one base layer constituted of an organic material and/or an inorganic material, between the substrate and the reflective layer.

9. The solar reflector plate according to claim 2, further comprising at least one base layer constituted of an organic material and/or an inorganic material, between the substrate and the reflective layer.

10. The solar reflector plate according to claim 1, wherein the reflective layer contains aluminum and/or silver.

11. The solar reflector plate according to claim 10, further comprising an interlayer containing at least one selected from the group consisting of a silane coupling agent, a zirconium coupling agent, and an organic resin, between the reflective layer and the protective layer.

12. The solar reflector plate according to claim 11, further comprising at least one base layer constituted of an organic material and/or an inorganic material, between the substrate and the reflective layer.

13. The solar reflector plate according to claim 10, further comprising at least one base layer constituted of an organic material and/or an inorganic material, between the substrate and the reflective layer.

14. The solar reflector plate according to claim 1, further comprising an interlayer containing at least one selected from the group consisting of a silane coupling agent, a zirconium coupling agent, and an organic resin, between the reflective layer and the protective layer.

15. The solar reflector plate according to claim 14, further comprising at least one base layer constituted of an organic material and/or an inorganic material, between the substrate and the reflective layer.

16. The solar reflector plate according to claim 1, further comprising at least one base layer constituted of an organic material and/or an inorganic material, between the substrate and the reflective layer.

17. A solar reflector plate consisting of:
a substrate;
a reflective layer provided onto the substrate; and
a protective layer provided onto the reflective layer,
the solar reflector plate having a laminated structure in which the substrate, the reflective layer and the protective layer are stacked in this order and are co-extensive with each other, and
wherein the protective layer contains silicon and an organic substance, contains silicon in an amount of 10% by mass to 60% by mass in terms of $SiO_2$, and has 1.5 to 3.2 oxygen atoms on average that form a chemical bond with silicon.

18. A solar reflector plate consisting of:
a substrate;
a reflective layer provided onto the substrate;
an interlayer;
a protective layer provided onto the interlayer, the solar reflector plate having a laminated structure in which the substrate, the reflective layer, the interlayer and the protective layer are stacked in this order and are co-extensive with each other, and wherein the protective layer contains silicon and an organic substance, contains silicon in an amount of 10% by mass to 60% by mass in terms of $SiO_2$, and has 1.5 to 3.2 oxygen atoms on average that form a chemical bond with silicon, and wherein the interlayer contains at least one kind selected from a group consisting of a silane coupling agent, a zirconium coupling agent, and an organic resin.

19. A solar reflector plate consisting of:

a substrate;

a base layer comprising an organic material and/or an inorganic material;

a reflective layer provided onto the base layer; and a protective layer provided onto the reflective layer, the solar reflector plate having a laminated structure in which the substrate, the base layer, the reflective layer and the protective layer are stacked in this order and are co-extensive with each other, and wherein the protective layer contains silicon and an organic substance, contains silicon in an amount of 10% by mass to 60% by mass in terms of $SiO_2$, and has 1.5 to 3.2 oxygen atoms on average that form a chemical bond with silicon.

\* \* \* \* \*